United States Patent [19]

Veronesi

[11] Patent Number: 4,734,250

[45] Date of Patent: Mar. 29, 1988

[54] CONCENTRIC PIPE LOOP ARRANGEMENT FOR PRESSURIZED WATER NUCLEAR REACTORS

[75] Inventor: Luciano Veronesi, O'Hara Township, Allegheny County, Pa.

[73] Assignee: Westinghouse Electric Corp., Pittsburgh, Pa.

[21] Appl. No.: 913,629

[22] Filed: Sep. 30, 1986

Related U.S. Application Data

[63] Continuation of Ser. No. 594,059, Mar. 28, 1984.

[51] Int. Cl.$^4$ .............................................. G21C 1/01
[52] U.S. Cl. ..................................... 376/292; 376/399
[58] Field of Search ............... 376/282, 283, 291, 292, 376/399

[56] References Cited

U.S. PATENT DOCUMENTS

| | | |
|---|---|---|
| 3,127,322 | 3/1964 | Dodd . |
| 3,151,034 | 9/1964 | Douglass et al. . |
| 3,245,879 | 4/1966 | Purdy et al. ........................ 376/283 |
| 3,247,076 | 4/1966 | Tutte et al. ......................... 376/292 |
| 3,290,222 | 12/1966 | Schoessow et al. ................ 376/282 |
| 3,401,082 | 9/1968 | Ammon et al. ..................... 376/282 |
| 3,425,907 | 2/1969 | Bonsel et al. . |
| 3,953,289 | 4/1976 | Costes ................................ 376/399 |
| 4,038,134 | 7/1977 | Dorner et al. . |
| 4,039,377 | 8/1977 | Andrieu et al. . |
| 4,243,487 | 1/1981 | Schweiger . |
| 4,380,084 | 4/1983 | Aubert ............................... 376/292 |
| 4,400,345 | 8/1983 | Pierart et al. ...................... 376/292 |

*Primary Examiner*—Deborah L. Kyle
*Assistant Examiner*—Richard W. Wendtland
*Attorney, Agent, or Firm*—D. C. Abeles

[57] ABSTRACT

A pipe loop arrangement for the closed primary system of a nuclear reactor. The heated reactor coolant flows through a horizontally positioned hot leg pipe while the return flow cooled reactor coolant flows through a cold leg pipe concentrically mounted within the hot leg pipe. A bell-mounted suction port and the high pressure discharge port of the reactor coolant pump are located within an outlet chamber with the steam generator. A transition piece slip fitted to an opening within the reactor vessel outlet flange connects the cold leg pipe to the inlet to the nuclear core. A flow shroud surrounding the pump discharge connects the pump discharge to the cold leg pipe, forms a volute for the pump discharge and separates the outlet chamber from the inlet chamber of the steam generator.

13 Claims, 4 Drawing Figures

CONCENTRIC PIPE LOOP ARRANGEMENT FOR PRESSURIZED WATER NUCLEAR REACTORS

This application is a continuation of application Ser. No. 06/594,059 filed Mar. 28, 1984.

BACKGROUND OF THE INVENTION

1. Field of the Invention

This invention relates in general to the field of pressurized water nuclear reactors and in particular to the field of coolant water piping arrangements between the reactor vessel and the steam generators of a pressurized water nuclear reactor.

2. Description of the Prior Art

In very simplified and general terms, pressurized water nuclear reactors include primary and secondary flow systems. The primary system is usually a closed system using light water as the reactor coolant and the nuclear moderating fluid. The light water reactor coolant is heated upon flowing through a nuclear core which is contained within a pressure vessel. The heated reactor coolant is then ducted through a steam generator where it transfers heat to another fluid within the secondary system. The fluid in the primary system is, of course, arranged in heat transfer relationship, within the steam generator, to the fluid in the secondary system. Finally, the reactor coolant flows to a main reactor coolant pump which pumps the coolant back through the pressure vessel repeating the above-described flow cycle.

The fluid within the secondary system most often is also light water which is converted into steam within the steam generator. The steam is used to power a steam turbine which is mechanically connected to an electrical generator which in turn converts the power originally derived from the nuclear core into electricity.

A typical commercial nuclear power plant may contain four separate primary flow systems each of which is associated with its own separate secondary flow system. Each primary flow system is generally termed a "primary coolant flow loop", or more simply, a "flow loop". The portion of the flow loop from the reactor coolant pump to the pressure vessel is usually designated as the "cold leg"; while the portion from the reactor vessel to the steam generator is usually designated as the "hot leg".

In a flow loop of the prior art, the cold leg includes piping connecting the main coolant pump to the reactor vessel. The hot leg includes piping connecting the reactor vessel to the steam generator. A "crossover" pipe leg comprises the piping connecting the steam generator to the main coolant pump. Each of the described piping legs are series flow connected but are otherwise physically removed or separated from each other. Thus, in the highly unlikely event of a break or fracture in any of the legs, some of the primary core coolant would be vented from the reactor vessel and would be released to but contained within the reactor containment building.

A failure of the exposed cold leg primary coolant piping between the pump and the reactor vessel, such as a large break (greater than six (6) inch internal diameter pipe) loss-of-coolant accident could result in extensive damage. Such an accident could cause c ore uncovery by the reactor coolant resulting in high peak clad temperatures of the fuel elements in the vicinity of 2000° F. to 2200° F. This in turn could cause extensive damge to the nuclear core and thereby release radioactive fission products to and within the reactor containment building. It is to be noted that the described accident and the described results are mere possibilities-not probabilities.

There are other accidents which can also be envisioned notwithstanding the low probability of the occurrence of the same. For example, the crossover leg in the nuclear reactors of the prior art, which transports the coolant flow from the steam generator to the main coolant pump suction or inlet could also fracture or break. Since the crossover leg piping typically drops to a level several feet below the top of the nuclear core before turning vertically upward to the reactor coolant pump suction thereby forming a loop seal (because of its physical geometry) which inhibits hot leg venting of steam in the unlikely event of a small loss-of-coolant accident (a break of a pipe having an internal diameter less than six (6) inches). However, such an accident could theoretically uncover the core to the extend that is is blanketed by steam but not liquid water, resulting in peak fuel clad temperatures in the range of 1100° F. to 1300° F. Temperatures of this level can cause fuel damage which may make the core unstable which could result in the release of fission products to the reactor coolant supply system or to the containment building.

Accidents of the type described could cost millions of dollars in recovery expense plus two or more years of lost generation of power costs. Obviously, a relatively expensive and undesirable result.

Still another undesirable aspect of the flow loops of the prior art is again concerned with the loop seal crossover leg. In the event of a loss-of-coolant accident the loop seal acts as a trap for the condensate from the steam generator. The level of the condensate will gradually build up until a slug of water overflows from the trap and hits the main coolant pump impeller. Thereafter, steam will impact upon the impeller until the level of condensate again builds up, overflows, and causes the impeller to be struck by another slug of water. Such alternating action continues and can cause excessive vibration resulting in the necessity to shut down the pump. Loss of the pump following a loss-of-coolant accident is undesirable because the pump could be used to circulate steam water mixtures thereby providing an additional and diverse means of cooling the core and preventing core damage.

Accordingly, a primary object of the present invention is to provide a pipe loop arrangement which eliminates the possibility of a large loss-of-coolant accident and the attendant consequences thereof as a result of a failure of the cold leg piping.

Another object of the present invention is to provide a pipe loop arrangement which prevents the core from being uncovered by liquid water during a small loss-of-coolant accident resulting from a failure of the cold leg piping.

Still another object of the present invention is to provide a coolant pump and pipe loop arrangement wich upon a loss-of-coolant accident will continuously supply a mixture of steam and water to the impeller of the main coolant pump for continued circulation of the steam-water mixture during the period of time following the accident.

A further object of the present invention is to provide a primary system pipe loop arrangement having the cold leg piping concentrically mounted within the hot leg piping.

A still further object of the present invention is to provide a primary system pipe loop arrangement which minimizes the length of piping to reduce the piping pressure drop.

An even further object of the present invention is to provide a primary system pipe loop arrangement which allows for increasing the efficiency of the reactor coolant pump.

An even further object of the present invention is to provide a primary system pipe loop arrangement which eliminates the need to have a loop seal crossover leg.

SUMMARY OF THE INVENTION

The present invention comprises a concentric pipe loop arrangement for a nuclear reactor for circulating the main reactor coolant from the reactor pressure vessel to the steam generator and then to the reactor coolant pump and finally back to the pressure vessel. The arrangement comprises locating the cold leg piping inside of the hot leg piping and integrating the reactor coolant pump and volute within the steam generator channel head. The shaft seal of the pump, the pump motor and the flywheel are positioned vertically below the steam generator thereby eliminating the need for a loop seal crossover leg. A slip fit transitional piece is furnished between the end of the cold leg pipe and the reactor vessel downcomer to permit hot coolant flow to reach the annulus surrounding the cold leg pipe.

BRIEF DESCRIPTION OF THE DRAWINGS

Various other objects, advantages and features of the invention will become apparent to those skilled in the art from the following discussion taken in conjunction with the following drawings, in which.

DESCRIPTION OF THE PREFERRED EMBODIMENTS

Figure 1:
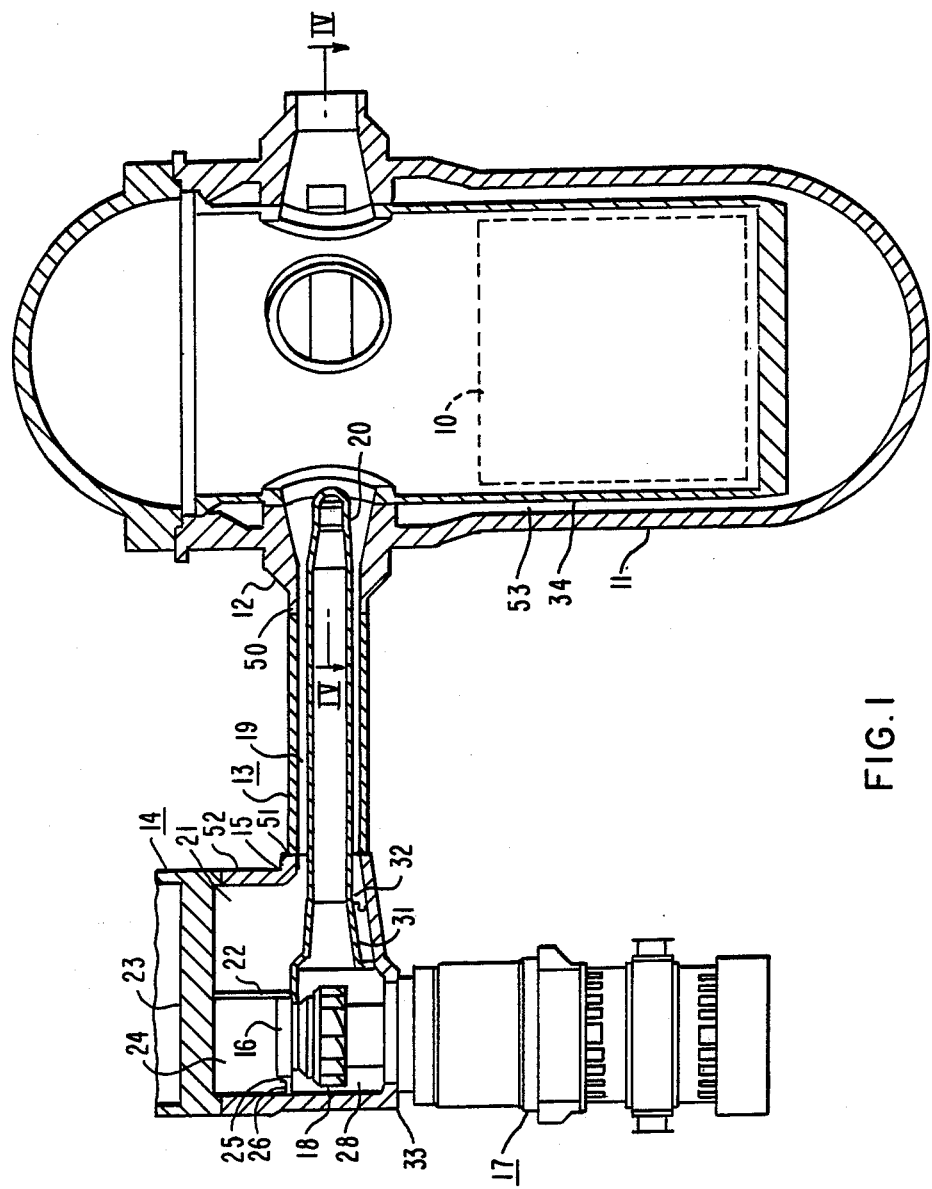
FIG. 1 is an elevational view, partly in cross section of the inventive piping arrangement illustrating the general relative arrangement of the piping, the reactor vessel, the steam generator and the reactor coolant pump.

Referring now to FIG. 1 of the drawings, there is depicted therein the inventive arrangement of the primary system flow loop piping which ducts the primary system fluid between the reactor pressure vessel, the steam generator and the main reactor coolant pump. The primary system fluid also comprises the reactor coolant which may be light water. The reactor coolant is heated upon passing through the nuclear core 10 which is contained within the reactor pressure vessel 11. The heated reactor coolant simultaneously exits through one or more reactor vessel outlet ports 12, flows through the hot leg piping 13 and enters into the steam generator 14 through a main coolant inlet port 15 thereof. The heat acquired by the reactor coolant is transferred to a secondary fluid within the steam generator 14. The secondary fluid is physically separated from but is arranged in heat transfer relationship with the primary fluid by a "U"-shaped tube bundle within the steam generator 14. The now cooled reactor coolant enters a suction port 16 of the reactor coolant pump 17 and is discharged therefrom through the high pressure discharge 18 into the cold leg piping 19. It is to be especially noted that the cold leg piping 19 is concentrically mounted within the hot leg piping 13. The cooled reactor coolant reenters the pressure vessel through a slip-fitted transition piece 20.

The hot leg piping 13 comprises a straight length of pipe which is seal and structurally welded at one end 50 to the outlet port or nozzle 12. The other end 51 of the hot leg piping 13 is seal and structurally welded to the inlet port or nozzle 15 of the steam generator 14. The center lines of outlet nozzle 12 and inlet nozzle 15 are substantially coincident. In this manner, the axial center line of hot leg piping 13 is substantially horizontal. Since such horizontal arrangement is not consistent with a steam generator inlet nozzle which is perpendicular to the semihemispherical shape of the bottom 52 of the steam generator 14, inlet nozzle 15 as shown in FIG. 1 is cast or formed integrally with the semihemispherical bottom 52 of steam generator 14. Inlet nozzle 15 may, of course, in the alternative, be separately cast and welded to steam generatore 14.

Steam generator 14 as its name implies, generates steam. The secondary fluid is converted into steam within the steam generator upon being heated by the hot primary system fluid. The hot primary system fluid enters the inlet chamber 21 steam generator 14 by way of inlet nozzle 15. Inlet chamber 21 comprises one-half of the lower semihemispherical-shaped bottom 52 portion of steam generator 14. A no-flow baffle or divider 22 vertically separates the inlet chamber 21 from the other half 24. A tube sheet 23 forms a horizontal sealing member which separates the primary and secondary fluids and provides for an end location for the tube bundle (not shown) within the steam generator. Thus, hot primary coolant enters the steam generator via the inlet nozzle 14, fills inlet chamber 21, flows up through one side of the "U"-shaped tube bundle and down the other side of the tube bundle to the outlet chamber 24. Outlet chamber 24 comprises the other half of the lower end 52 of the steam generator 14 having divider plate 22 therebetween.

Figure 2:
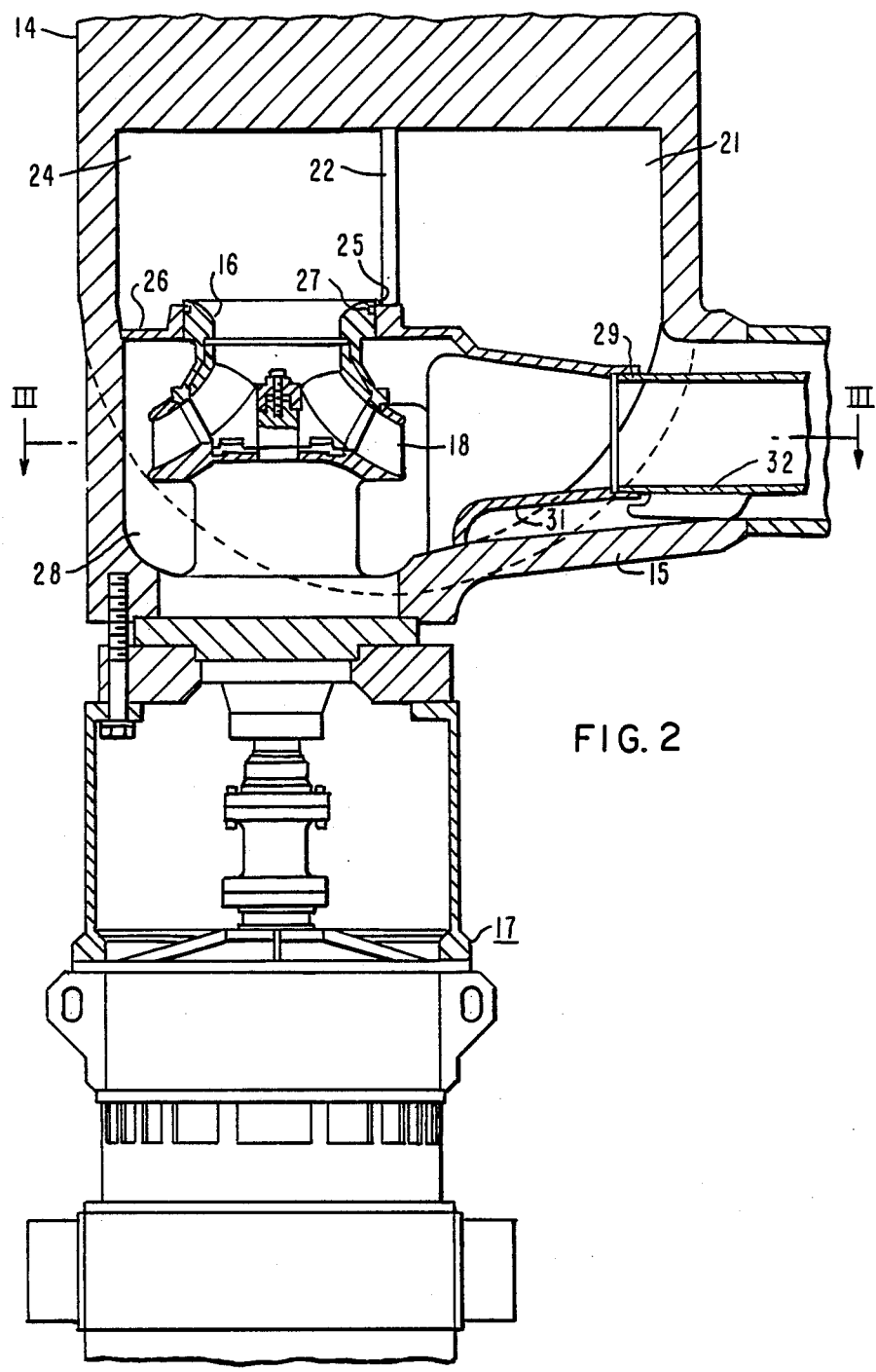
FIG. 2 is a reversed, enlarged, detailed view partially in cross section of the steam generator and pump arrangement of FIG. 1.
Figure 3:
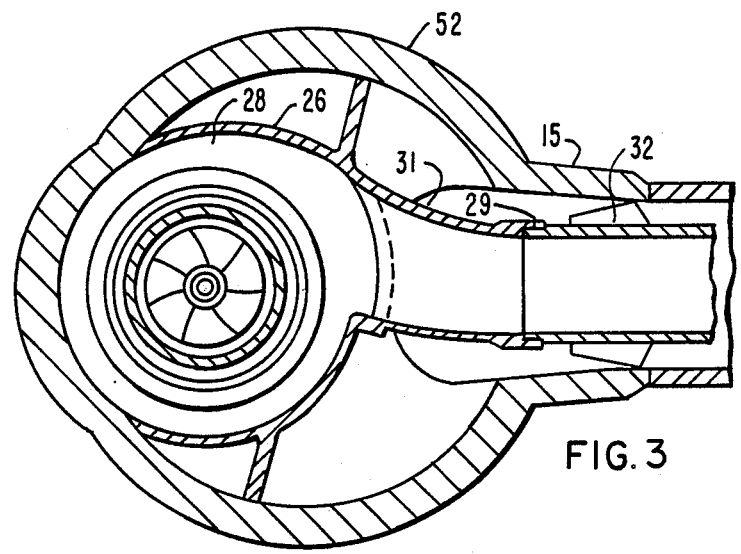
FIG. 3 is a cross-sectional view of the steam generator and reactor coolant pump arrangement of FIG. 2 taken along the line III—III; and, FIG. 4 is a cross-sectional view of the reactor vessel and piping arrangement of FIG. 1 taken along the line IV—IV.

Outlet chamber 24 also serves as an inlet chamber for the reactor coolant pump 17. The now cooled primary system fluid enters the pump 17 through a bell-mouthed suction port 16 which is slidingly sealed to an opening 25 in flow shroud 26 by, for example, a piston ring seal 27 as shown in FIG. 2. The bell-mouth suction port 16 materially improves the pump's 17 hydraulic efficiency thereby increasing the net power output of the nuclear reactor. Flow shroud 26 is seal and structurally welded to divider plate 22 and the internal diameter of outlet chamber 24. Flow shroud 26 forms a volute or enclosure 28 surrounding the high pressure discharge 29 from reactor coolant pump 17 (see FIG. 3). It is to be noted that the volute 28 is, in part, formed by the interior surface 36 of the bottom head of the steam generator 14 and that the outlet portion of the enclosure 28 forms a circular, necked-down transition pipe 31 to which is connected one end 32 of the cold leg piping 19. In this manner, reactor coolant flow is discharged from the tube bundle within the steam generator 14 into the outlet chamber 24 and into the bell-mouthed suction port 16 of reactor coolant pump 17. The reactor coolant is then discharged into the volute 28 within flow shroud 26, through transition pipe 31 and into the cold leg piping 19.

Outlet chamber 24 also includes a flange 33 which provides a means for sealingly and structurally attaching the reactor coolant pump 17 to the steam generator 14. Flange 33, like inlet nozzle 15, is integrally formed with the bottom 52 of steam generator 14.

As can be seen, end 31 of cold leg piping 19 is slip-fitted within the transition pipe 31. Piston ring seals 29 provide the necessary seal at this location. An absolute seal-tight joint is not necessary inasmuch as any leakage, however small, will leak into the inlet chamber 21 in the steam generator 14 thereby preserving the integrity of the primary loop piping.

Figure 4:
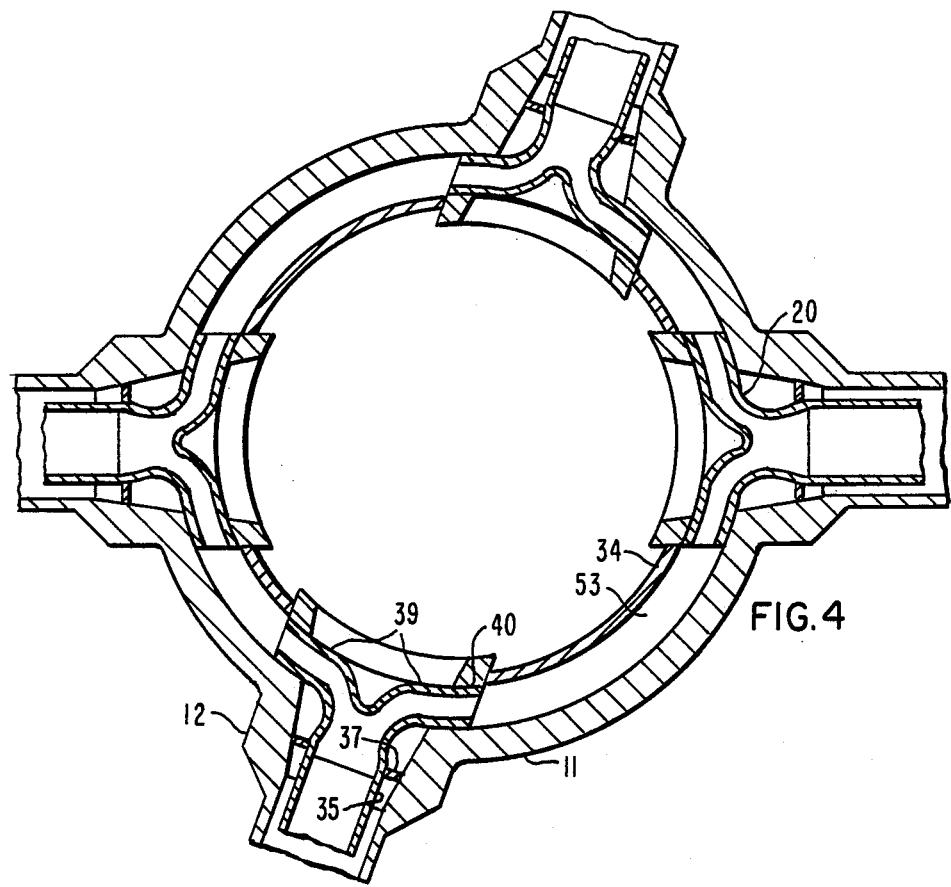

As previously explained and described, cold leg piping 19 is concentrically mounted within hot leg piping 13. Thus, upon leaving the high pressure discharge 29 of coolant pump 17, the cooled reactor coolant flows within cold leg piping 19, through slip-fit transition piece 20, and into the reactor vessel downcomer comprising the annulus 53 between the pressure vessel 11 and the core barrel 34 for subsequent passage through the nuclear core 10. Slip-fit transition piece 20 is welded to the other end 35 of cold leg piping 19. FIG. 4 shows spacer bars 37 between transition piece 20 and the inner surface 38 of the reactor vessel outlet flange or nozzle 12 which aid in maintaining the concentricity of cold leg piping 19 with hot leg piping 13 in a horizontal direction. Transition piece 20 includes two outlet ends 39 forming a "Y"-shaped configuration. Each outlet end slip fits within an opening 40 in the wall of outlet nozzle 12 between the reactor vessel 11 and the core barrel 34. The relationship of openings 40 and legs 39 provide for concentricity of the hot 13 and cold 19 leg piping in a vertical direction. Of interest is the fact that the core barrel flange 41 fits against the reactor vessel outlet nozzle 12 in a manner as is common in the art.

In accordance with the invention herein a concentric pipe loop arrangement is provided which includes locating the cold leg piping 19 within the hot leg piping 13, integrating the reactor coolant pump 17 and volute 28 inside the steam generator 14; locating the shaft seal 41, motor 42 and flywheel 43 thereof vertically below the steam generator 14; and, a slip-fit transition piece 20 between the cold leg piping 19 and the reactor vessel downcomer which permits hot coolant flow to reach the annulus surrounding the hot leg piping 13. Such features eliminate the loop seal crossover leg of the prior art which is the main cause of core uncovery during a small loss-of-coolant accident and eliminates a large, cold leg loss-of-coolant accident which produces the highest peak fuel-clad temperatures and core damage.

The inventive arrangement also results in less piping requiring less pumping power than prior art arrangements. A nuclear power plant using the concentric piping arrangement may directly use the reduction in pumping power or use the same pumping power to increase the flow of coolant to raise core temperatures and steam pressure which in turn increases plant efficiency and power output.

The invention herein also provides a top inlet 16 to the coolant pump 17. This is in constrast to the prior art bottom inlet to the pump from the loop-seal crossover pipe leg which following a loss-of-coolant accident acts as a trap for condensate from the steam generator which gradually builds up in level until a slug of water hits the pump impeller. The alternating steam then water impacting upon the pump impeller can cause excessive vibration requiring pump shutdown. On the other hand, the top inlet 16 to the pump 17 of the present invention eliminates such slug flow allowing the reactor coolant pump 17 to circulate a mixture of steam and water during a loss-of-coolant accident thereby providing an additional and diverse means of core cooling and prevention of possible core damage.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

I claim:

1. In a nuclear reactor primary coolant system having a reactor vessel, a steam generator, and a reactor coolant pump, a pipe loop arrangement comprising:
    a first pipe connecting an outlet of said reactor vessel with an inlet of said steam generator whereby hot reactor coolant is ducted to said steam generator;
    a second pipe substantially concentrically mounted within said first pipe forming an annulus therebetween;
    means for flow connecting a steam generator outlet with an inlet to said pump;
    means for flow connecting an outlet of said pump with said second pipe; and,
    means for flow connecting said second pipe with inlets to said reactor vessel whereby cooled reactor coolant is ducted from said steam generator to said reactor vessel comprising a hollow Y-shaped transition piece welded at one end to said second pipe and having two other ends each slidingly engaged with a respective inlet to said reactor vessel whereby said second pipe is maintained in said concentric arrangement with said first pipe; and,
    means for smoothing the flow of hot reactor coolant around said transition piece and into said first pipe.

2. The pipe loop arrangement of claim 1, wherein said first and said second pipes are each arranged in a substantially horizontal position.

3. The pipe loop arrangement of claim 1, wherein said means for flow connecting a steam generator outlet with a pump inlet comprises a suction port having a rounded edge at the inlet thereof and a cross-sectional flow area which gradually decreases to the size of the pump inlet.

4. The pipe loop arrangement of claim 3, wherein said suction port is located within an outlet chamber formed within said steam generator.

5. The pipe loop arrangement of claim 1, wherein said means for flow connecting a pump outlet to said second pipe comprises a flow shroud sealingly interposed between said pump inlet and said pump outlet said flow shroud surrounding the high pressure discharge of said pump and having a circularly shaped end portion with an opening therethrough, said end portion being connected to said second pipe.

6. The pipe loop arrangement of claim 5, wherein said flow shroud comprises a volute for the high pressure discharge of said pump.

7. The pipe loop arrangement of claim 5, wherein said second pipe is telescopically engaged with said circular end portion of said flow shroud with a sliding ring seal therebetween.

8. The pipe loop arrangement of claim 6, wherein said inlet of said steam generator is connected to an inlet chamber within said steam generator and said pump inlet is located within an outlet chamber within said steam generator, said inlet and outlet chambers being sealingly separated by said flow shroud and said end portion of said flow shroud being concentrically arranged within said inlet of said steam generator.

9. The pipe loop arrangement of claim 1, wherein said means for flow connecting the second pipe to the reactor vessel comprises a hollow transition piece welded at one end to said second pipe and having at least one other end slidingly engaged with an opening in said reactor vessel outlet, said opening being flow connected to a flow channel within the reactor vessel connecting the reactor vessel inlet with the nuclear core.

10. The apparatus of claim 1, wherein said means for smoothing the flow of hot reactor coolant around said transition piece and into said first pipe comprises a flow shroud located at the crotch of the Y-shaped transition piece.

11. The apparatus of claim 10, wherein said flow shroud is divergently curved from an end located upstream of said crotch to a downstream end located at said crotch.

12. The apparatus of claim 1, including means for smoothing the flow of hot reactor coolant downstream of the crotch of said Y-shaped transition piece.

13. The apparatus of claim 12, wherein said means for smoothing the flow of hot reactor coolant downstream of the crotch of said Y-shaped transition piece comprises two flow shrouds each being respectively connected to one of the two legs of the Y-shaped transition piece and extending therefrom in a convergently-curved shape to a location downstream of said crotch.

* * * * *